Oct. 7, 1958     F. KUHRT ET AL     2,855,549

HALL VOLTAGE GENERATORS

Filed Sept. 10, 1956

United States Patent Office 2,855,549
Patented Oct. 7, 1958

2,855,549

HALL VOLTAGE GENERATORS

Friedrich Kuhrt and Karl Maaz, Nurnberg, Germany, assignors to Siemens-Schuckertwerke Aktiengesellschaft, Berlin, Germany, a German corporation Application September 10, 1956, Serial No. 608,739

Claims priority, application Germany September 12, 1955

21 Claims. (Cl. 317—235)

Our invention relates to Hall-voltage generators of the type disclosed in the copending application of Friedrich Kuhrt, Serial No. 519,319, filed July 1, 1955, and assigned to the assignee of the present invention. In such Hall generators, one of the Hall-voltage conductors is located in juxtaposition to the semiconducting resistance body of the Hall generator and extends from one of the Hall electrodes of the resistance body in the direction toward the other Hall electrode, this conductor being insulated from the semiconducting resistance body.

When using such Hall generators in a magnetic field within an area where a high temperature gradient exists the Hall-voltage output may become falsified by thermoelectric effects which, in certain cases, may reach the order of magnitude of the Hall voltage to be measured or responded to. It is therefore an object of our invention to improve Hall generators of the above-mentioned type so as to minimize or fully eliminate such deficiencies.

The present invention is a further development of the device described in the earlier application. According to the copending application, the occurrence of an inductive component in the Hall-electrode circuit is prevented by the following expedient: One of the wires leading to the Hall electrodes, from which the Hall voltage is taken, extends toward the other Hall electrode and is placed above the semiconducting resistance body and in insulated relation thereto, so that the magnetic field cannot induce a voltage in the Hall-electrode circuit. If, however, such a Hall generator device is introduced into a magnetic field having a high temperature gradient, so that the two Hall electrode points exhibit respectively different temperatures, there may occur thermo-voltages. Under some circumstances, the thermo-voltages may have the same order of magnitude as the Hall voltage to be measured or responded to. According to the present invention such thermo-voltages are compensated for by the fact that the portion of the Hall-voltage conductor located immediately above, and adjacent to, the semiconducting resistance body consists of the same semiconducting material as that resistance body itself. For instance, when the semiconducting body of the Hall generator consists of indium arsenide, then according to the present invention the portion of the Hall-electrode conductor located adjacent to the resistance body is also made of indium arsenide.

Figure 1:
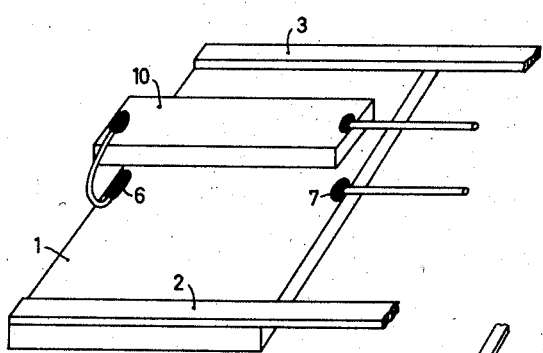
Figure 2:
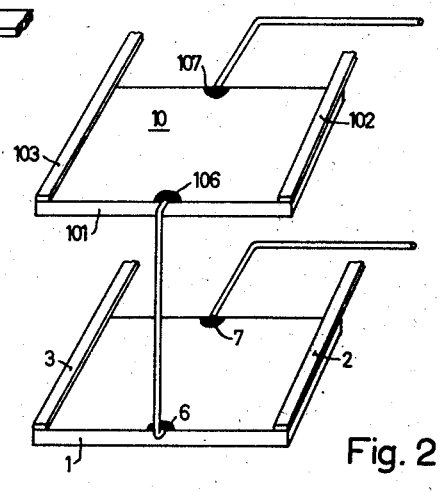
Figure 4:
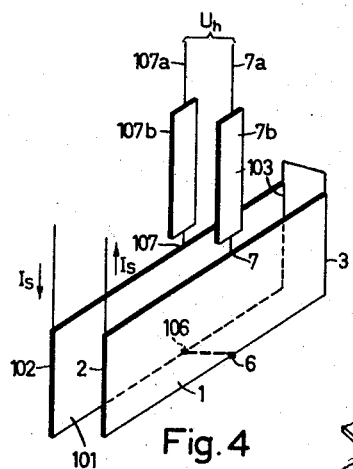
Figure 3:
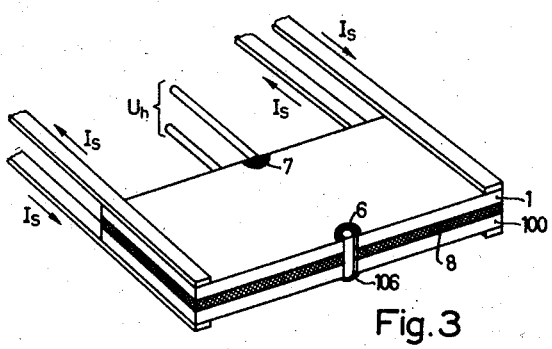

The invention will be more fully explained with reference to the embodiments perspectively and schematically illustrated on the drawing in which Figs. 1 and 2 show two different forms of Hall generators according to the invention each represented by a somewhat exploded view; Fig. 3 is a non-exploded view of a slightly modified device generally similar to that of Fig. 2; and Fig. 4 shows another modification of such a Hall generator. All figures are on greatly enlarged scale as the actual area of each Hall plate may only be 2 x 5 mm., for instance.

The Hall generator illustrated in Fig. 1 has a semiconductor plate or wafer 1 of indium arsenide. Attached to respective opposite edges of the Hall plate 1 are terminals 2 and 3 for the supply of the primary control current. Also attached to the Hall plate 1 are two electrodes 6 and 7 for delivering the Hall voltage. The electrodes 6 and 7 are located about midway between the terminals 2 and 3 at the two other edges of the Hall plate. The Hall-voltage lead connected to the Hall electrode 6 is carried out of the device in a direction toward the Hall electrode 7 and is located above, or in proximity to, the Hall plate 1 but in insulated relation thereto. The portion 10 of the voltage lead located above the Hall plate 1 consists of the same semiconducting material, namely indium arsenide of which the Hall plate 1 is made.

The Hall generator is used by placing it into the magnetic field to be investigated and so orienting the Hall plate that the magnetic field lines extend at an angle, for instance perpendicularly, to the wafer plane. As long as the magnetic field or its component perpendicular to the wafer plane is zero the two Hall electrodes 6 and 7 have the same electric potential so that no voltage exists between them; but when a perpendicular component of magnetic field strength is effective, the two electrodes 6 and 7 are no longer equipotential so that a voltage drop, the so-called Hall voltage, is generated.

As mentioned, the advantage of the particular Hall generator described above resides in the compensation of thermo-electric voltages which may occur when the Hall generator is used in magnetic fields in which high temperature differences may occur. Such conditions are encountered, for instance, when the Hall generator is placed onto the surface of a magnetic body for the purpose of measuring the tangential field strength of this body, and if the temperature of the magnetic body, which may be part of an electric machine, differs greatly from the ambient temperature. In such cases the heat dissipating conditions at the respective connection points of the two Hall electrodes are greatly different from each other so that these two connecting points may possess considerably different temperatures respectively.

According to a modification of the invention, also for the purpose of compensating thermo-voltages, the portion of the Hall voltage conductor located above the semiconducting resistance body of the Hall generator need not necessarily consist of the same material as that body itself but may be made of a material which, in coaction with the other material of the lead, possesses the same thermoelectric force.

In order to avoid accelerated temperature equalization at the so-called "cold junction," it is preferable to give the portion of the voltage conductor located above the semiconducting Hall plate the same mass as the Hall plate itself, assuming that the just-mentioned portion has the same heat conductance as the Hall plate. According to another feature of our invention, therefore, the portion of the Hall-voltage conductor located above the Hall plate is given approximately the same dimensions as the Hall plate itself. According to a more specific feature, the just-mentioned conductor portion itself is also designed as a Hall voltage generator.

A Hall generator of the just-mentioned modified type is schematically illustrated in Fig. 2. The portion 10 of the Hall-voltage conductor coming from the Hall electrode 6 of the Hall plate 1 is designed as another Hall generator. In Fig. 2, the active semiconductor plate or wafer of the first Hall generator is denoted, by 1 as in Fig. 1. The two terminals 2 and 3 for the supply of the primary current, and the two Hall electrodes 6 and 7 are also in accordance with the embodiment of Fig. 1. However, in distinction from Fig. 1, the portion 10 of the voltage conductor is also provided with an active semiconductor plate 101 with two terminals 102 and 103 for the supply of current and with two Hall electrodes 106, 107. For the purpose of illustration, the second Hall generator 10 is shown spaced upwardly from the first Hall generator a considerable amount. In reality, the spacing between the two Hall generators is very slight and is determined only by the thickness of the insulating layer required between the two Hall generators.

To avoid undesired cross-currents, the control circuits of the two Hall generators, namely the circuit for passing current between terminals 2 and 3 on the one hand, and the circuit for supplying current through terminals 102 and 103 on the other hand, may be electrically insulated from each other. If, for instance, the current terminals 2 and 103 are conencted to the positive pole of a voltage source and the electrodes 3 and 102 to the negative pole of the same source, then both Hall generators are influenced in the same direction by the magnetic field but they are traversed by controlling current in respectively different directions. For that reason, one Hall generator for instance the lower one, generates a Hall voltage in the direction from Hall electrode 7 toward Hall electrode 6, whereas the upper Hall generator generates a Hall voltage in the direction from electrode 106 to electrode 107. In the illustrated circuit diagram therefore, the two Hall voltages are connected in series, whereas the thermo-electric voltages, as in the preceding embodiment, are connected in series opposition. Consequently, the apparatus supplies an approximately doubled Hall voltage output while compensating the thermo-voltages against each other. Aside from thus increasing the sensitivity, such an apparatus has the advantage of avoiding disturbance by its own field when measuring tangential components of the magnetic fields being investigated.

Instead of connecting the current supply terminals 102 and 103 to the current sources with the above-mentioned polarities that make the two Hall voltages additive, there are cases in which it is preferable to reverse the polarity of connection at the current supply terminals so that the two Hall voltages act subtractively. This, for instance, results in an apparatus which is capable of directly measuring the vector gradient of a magnetic field. Since the spacing between the two Hall generators is definitely determined and fixed by the construction of the apparatus, such an apparatus is inherently capable of measuring the difference between the strength of the field at the location of one Hall generator as compared with the field strength at the location of the other Hall generator. The indicated Hall-voltage difference is then directly proportional to the gradient of the magnetic field.

As mentioned above, it is of advantage to insulate the two Hall generators from each other. For increasing the stability of Hall generators and to avoid bending and other impairment of the Hall plates, it has already been proposed to mount the active wafer of the Hall generator, for instance the Hall plate of indium arsenide, on a rigid insulating body so as to brace the Hall plate against any deformation. Depending upon the particular application, the insulating body may be made of sintered ceramic material or of ferritic material. It is further possible to cement together two normal Hall generators, each of which may be equipped with a bracing layer of sintered ceramic material, the sintered ceramic sides being placed upon each other. In many cases, however, for instance in apparatus for measuring the gradient of a magnegtic field, it is preferable to use only one insulating body and to arrange the two Hall generators on opposite sides of this insulating body, thus reducing the overall height of the device.

Such a device is illustrated in Fig. 3 where the insulating body is denoted by 8. This body consists of sintered ceramic material or ferrite material as explained above. In all other respects the device is similar to that of Fig. 2, except that the conductor which series-connects the Hall electrodes 6 and 106 is shown recessed so that it does not protrude beyond the contour of Hall plates 1 and 101. This permits placing this side of the Hall generator flush against a specimen, which is desirable for the above-described method of measuring tangential field strength of sheet-metal bodies.

If two Hall electrodes to which the voltage conductors are attached are subjected to a temperature so high above the ambient temperature that these two junction points may assume different respective temperatures despite their close proximity, then, for the purpose of most exacting measurements, it may be advantageous to connect to both Hall electrodes respective conductors which consist of the same material as the Hall plate at least in the conductor portion adjacent to the Hall plate.

An embodiment of this kind is illustrated in Fig. 4. It is assumed, as in Figs. 2, 3, that the voltage conductor located above the semiconducting resistance body of the Hall generator is likewise designed as a Hall generator, and that the control currents of the two Hall generators are so directed that the two Hall voltages are additive. The two Hall plates are denoted by 1 and 101 respectively in accordance with Figs. 2, 3; and the current supply terminals are denoted by 2, 3 and 102, 103. The Hall electrodes of the two Hall generators are shown at 6, 7 and 106, 107. The electrodes 6 and 106 are directly connected with each other. If the terminals 3 and 103 are likewise directly interconnected as illustrated, and if the control current passes through terminals 2 and 102 as indicated by the illustrated arrows, then the Hall voltage taken from across the electrodes 7 and 107 is approximately twice as large as the Hall voltage of each individual Hall generator. The two Hall electrodes 7 and 107 are very close to each other and for that reason assume substantially the same temperature so that a thermo-electric voltage cannot occur. However, if the temperature difference between the electrodes 6 and 7, or 106 and 107, is very large, then the electrodes 7 and 107 may assume temperatures considerably above the ambient temperature. Due to external influences, such as convection, the temperature difference between the electrodes 7 and 107 may then reach an order of up to a few degrees centigrade. Under such conditions, when connecting copper wires to the Hall electrodes, the occurring thermo-electric forces may be so large as to disturbingly affect the measuring result particularly when small magnetic fields are to be measured with high accuracy. Such large thermo-electric forces may occur particularly when the Hall plates are made of semiconducting compounds of the type $A_{III}B_V$, such as the above-mentioned indium arsenide or indium antimonide. To prevent such large thermo-electric forces, the conductors 7a and 107a connected to the two electrodes consist of the same material as the Hall plate in the respective portions 7b and 107b adjacent to the Hall plate. The optimum length of conductor portions 7b and 107b is dependent upon the temperature conditions. The conductor portions are preferably made so long that the points where lead 7a joins the portion 7b, and where lead 107a joins the portion 107b can be kept at substantially the same temperature so that any perhaps remaining temperature differences and the resulting thermo-electric forces have no appreciable effect upon the measuring result.

We claim:

1. A Hall voltage generator, comprising a semiconductor member having two mutually spaced current-supply terminals and having two Hall electrodes located between said terminals and spaced from each other transversely of the spacing direction of said terminals, respective Hall voltage conductors connected to said electrodes, one of said conductors having a portion extending from one of said electrodes in a direction toward the other electrode and in proximity to the surface of said member, and said conductor portion consisting of a semiconductor.

2. A Hall voltage generator, comprising a semiconductor member having two mutually spaced current-supply terminals and having two Hall electrodes located between said terminals and spaced from each other transversely of the spacing direction of said terminals, respective Hall voltage conductors connected to said electrodes, one of said conductors having a portion extending from one of said electrodes in a direction toward the other electrode and in proximity to the surface of said member, said member and said conductor portion consisting of the same semiconductor material.

3. A Hall voltage generator, comprising a first semiconductor member having two mutually spaced current-supply terminals and having two Hall electrodes located between said terminals and spaced from each other transversely of the spacing direction of said terminals, respective Hall voltage conductors connected to said electrodes, one of said conductors having a semiconductor portion extending from one of said Hall electrodes in a direction toward the other electrode and in proximity to the surface of said first semiconductor member, said semiconductor portion having substantially the same heat conductance and substantially the same mass as said member, said semiconductor portion having a pair of terminals spaced from each other transversely of the spacing direction of the first-mentioned terminals, said one conductor connecting said one Hall electrode to that terminal of the pair located towards the same side of the first semiconductor member, whereby any thermo-voltage generated by a difference in temperature across the Hall electrode is at least partly compensated by the opposite thermo-voltage across the pair of terminals of the said semiconductor portion.

4. A Hall voltage generator, comprising a semiconductor member having two mutually spaced current supply terminals and having two Hall electrodes located between said terminals and spaced from each other transversely of the spacing direction of said terminals, respective Hall voltage conductors connected to said electrodes, one of said conductors having a portion extending from one of said electrodes in a direction toward the other electrode and in proximity to the surface of said member, said member and said conductor portions consisting of the same semiconductor material and said conductor portion having substantially the same mass as said member.

5. In a Hall generator according to claim 4, said conductor portion having substantially the same dimensions as said member.

6. A Hall voltage generator, comprising a semi-conductor member having two mutually spaced current-supply terminals and having two Hall electrodes located between said terminals and spaced from each other transversely of the spacing direction of said terminals, respective Hall voltage conductors connected to said electrodes, one of said conductors having a portion extending from one of said electrodes in a direction toward the other electrode and in proximity to the surface of said member, said conductor portion consisting also of a Hall generator comprising a semiconductor member having two mutually spaced current-supply terminals and having two Hall electrodes spaced from each other transversely of the spacing direction of said latter two terminals, the transverse axes of the Hall electrodes of the respective semiconductors being directed in the same general direction, said one conductor connecting the Hall electrodes which are located at the adjacent ends of the transverse axes, to at least partly compensate the thermo-voltages that may be generated by a transverse temperature gradient, and a Hall circuit extending serially through said Hall electrodes of both Hall generators.

7. A Hall generator, comprising two Hall plates of the same semiconductor material and substantially the same dimensions arranged one above the other in face-to-face relation, each Hall plate having two mutually spaced current-supply terminals and having two Hall electrodes located between said terminals and spaced from each other transversely of the spacing direction of said terminals, the two Hall electrodes located on the same side of said respective Hall plates being electrically connected with each other, and two Hall-voltage conductors leading away from the respective two electrodes on the other side of said Hall plates, the four Hall electrodes being thereby series connected.

8. In a Hall generator according to claim 7, said two Hall plates having respective current-supply circuits insulated from each other and connected to the terminals of said respective Hall plates.

9. In a Hall generator according to claim 7, said two Hall plates having respective current-supply circuits of mutually opposed polarities relative to the current flow in said respective plates whereby the respective Hall voltages of said two Hall plates are additive.

10. In a Hall generator according to claim 7, said two Hall plates having respective current-supply circuits of the same polarities relative to the current flow in said respective plates whereby the respective Hall voltages of said two Hall plates are series opposed to each other.

11. A Hall generator according to claim 7, comprising a current-supply circuit connected to two terminals of said respective Hall plates that are located on the same side, said respective terminals on the other side being electrically interconnected so that the supplied current flows serially through said two plates and has in each plate a flow direction opposed to that in the other plate, whereby the Hall voltages of said respective Hall plates are additive.

12. A Hall voltage generator according to claim 7, comprising an insulating body, said two Hall plates being mounted on opposite sides respectively of said body.

13. A Hall voltage generator according to claim 7, comprising an insulating body of sintered ceramic material, said two Hall plates being mounted on opposite sides respectively of said body.

14. A measuring instrument comprising a Hall effect device, the device comprising a semiconductor resistance body, said body having two opposed large area faces, two opposed side edge faces, and two opposed longitudinal edge faces, current supply electrodes on and coextensive with at least a major part of the length of the side edge faces, and a pair of Hall electrodes for taking off the Hall voltage, each of said Hall electrodes being disposed adjacent a longitudinal edge face of said body between the side edge faces, conductors connected to said Hall electrodes, one of said conductors traversing directly over, insulated with respect to, and closely adjacent to one of the large area faces of the said body in the direction of the connecting point of the other conductor to the other Hall electrode of the same body, said one conductor being thereby directly led toward the other, the two being thereafter led away from said large area face together, to minimize any effective induction area with respect to any alternating magnetic flux to which the body may be subjected, said one conductor comprising a second semiconductor body having a pair of Hall electrodes opposite the first pair, the transverse Hall electrode axes being directed in the same general direction, the said one conductor connecting adjacent Hall electrodes of the respective semiconductor bodies, the four Hall electrodes being connected in series, connections for passing current longitudinally through the second semiconductor body, whereby any thermo-voltages generated by a difference in temperature across the Hall electrodes are in opposition.

15. The apparatus defined in claim 14, in which each of said semiconductor bodies comprises an $A_{III}B_V$ semiconductor compound.

16. The device defined in claim 14 in which each of the semiconductor bodies is a semiconductor plate formed of indium antimonide.

17. The device defined in claim 14 in which each of the semiconductor bodies is a semiconductor plate formed of indium arsenide.

18. A Hall generator, comprising two Hall plates of the same semiconductor material and substantially the same dimensions arranged one above the other in face-to-face relation, each Hall plate having two mutually spaced current-supply terminals and having two Hall electrodes located between said terminals and spaced from each other transversely of the spacing direction of said terminals, the two Hall electrodes located on the same side of said respective Hall plates being electrically connected with each other, and two Hall-voltage conductors leading away from the respective two electrodes on the other side of said Hall plates, each of said two Hall-voltage conductors consisting of the same material as said Hall plates at least in a conductor portion adjacent to said respective plates.

19. A Hall generator, comprising two Hall plates of the same semiconductor material and substantially the same dimensions arranged one above the other in face-to-face relation, each Hall plate having two mutually spaced current-supply terminals and having two Hall electrodes located between said terminals and spaced from each other transversely of the spacing direction of said terminals, the two Hall electrodes located on the same side of said respective Hall plates being electrically connected with each other, two Hall-voltage conductors leading away from the respective two electrodes on the other side of said Hall plates, and an insulating body of ferrite material, said two Hall plates being mounted on opposite sides respectively of said body.

20. A Hall effect device comprising a semiconductor plate, said plate having two opposed large area faces, two opposed side edge faces, and two opposed longitudinal edge faces, current supply electrodes on and substantially coextensive with the side edge faces, and a pair of Hall point electrodes for taking off the Hall voltage, each of said Hall point electrodes being disposed in the center of a longitudinal edge face of said plate, conductor leads connected to said Hall electrodes, one of said leads having a part traversing directly over and closely adjacent to a large area face of the said plate in the direction of the connecting point of the other conductor lead to the other Hall electrode of the same plate, the other large area face being free of Hall conductor leads, the two leads thereafter being led away adjoining each other, to minimize any effective induction area with respect to any alternating magnetic flux to which the plate may be subjected, said one conductor lead comprising a second semiconductor body having a pair of Hall electrodes each of which is adjacent a Hall electrode of the first pair, the transverse Hall electrode axes being substantially parallel, said one conductor lead connecting adjacent Hall electrodes of the respective semiconductor bodies, the four Hall electrodes being connected in series.

21. A Hall voltage generator, comprising a semiconductor member having two mutually spaced current-supply terminals and having two Hall electrodes located between said terminals and spaced from each other transversely of the spacing direction of said terminals, respective Hall voltage conductors connected to said electrodes, one of said conductors having a portion extending from one of said electrodes in a direction toward the other electrode and in proximity to the surface of said member, said conductor portion consisting also of a Hall generator, said Hall generator comprising a semiconductor member having two mutually spaced current-supply terminals and having two Hall electrodes spaced from each other transversely of the spacing direction of said latter two terminals, the transverse axes of the Hall electrodes of the respective semiconductors being directed in the same general direction, said one conductor connecting the Hall electrodes which are located at the adjacent ends of the transverse axes, to at least partly compensate the thermo-voltages that may be generated by a transverse temperature gradient, and a Hall circuit extending serially through said Hall electrodes of both Hall generators, said semiconductor members each comprising an $A_{III}B_V$ semiconductor compound.

References Cited in the file of this patent

UNITED STATES PATENTS

| | | |
|---|---|---|
| 1,778,796 | Craig | Oct. 21, 1930 |
| 1,822,129 | Craig | Sept. 8, 1931 |
| 1,825,855 | Craig | Oct. 6, 1931 |
| 1,998,952 | Edgar et al. | Apr. 23, 1935 |
| 2,736,822 | Dunlap | May 9, 1952 |